(No Model.)　　　　　　　　　　　　　　　　2 Sheets—Sheet 1.
J. V. SKOGLUND.
PROCESS OF MANUFACTURING NITRIC ACID.
No. 591,087.　　　　　　　　　Patented Oct. 5, 1897.
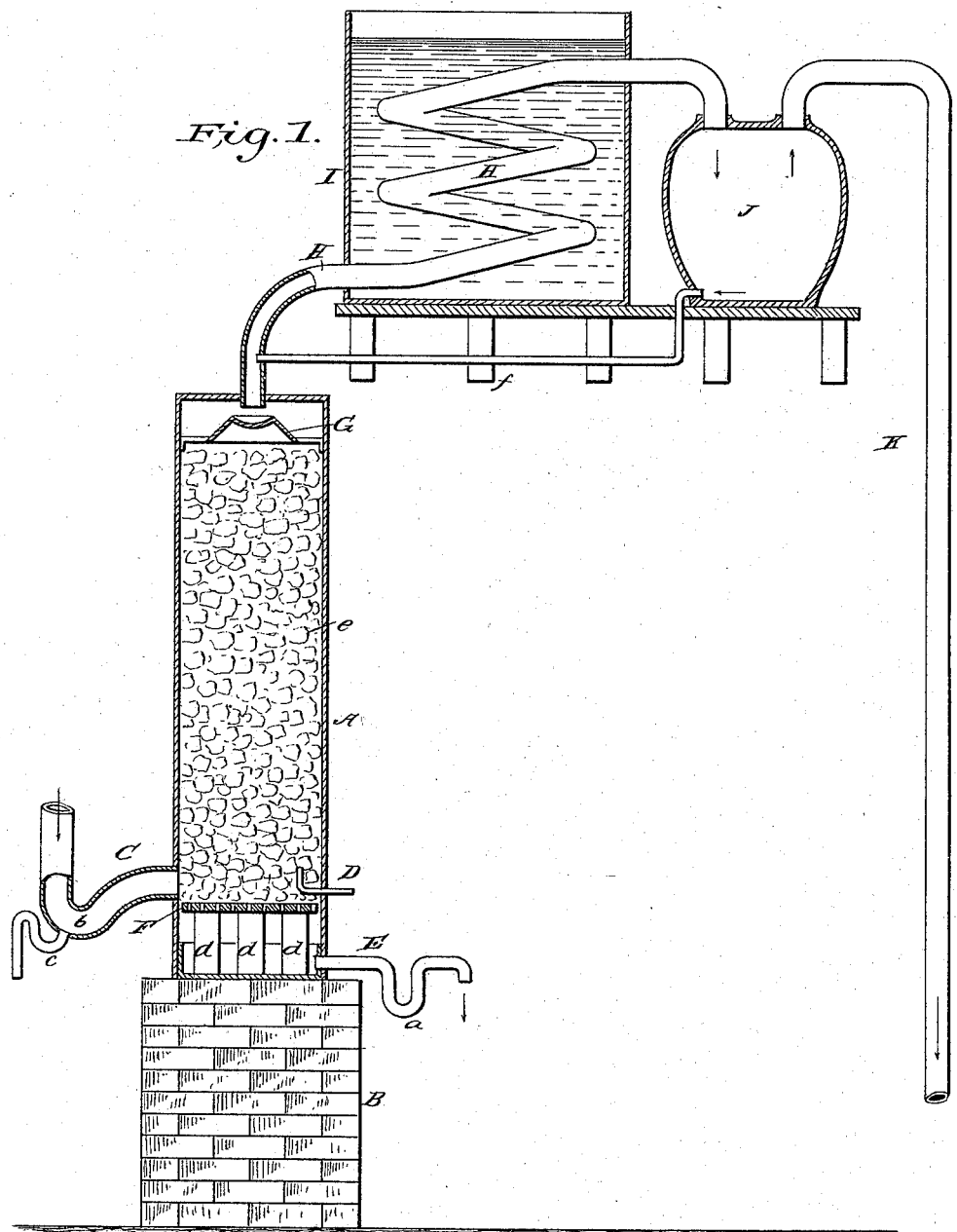

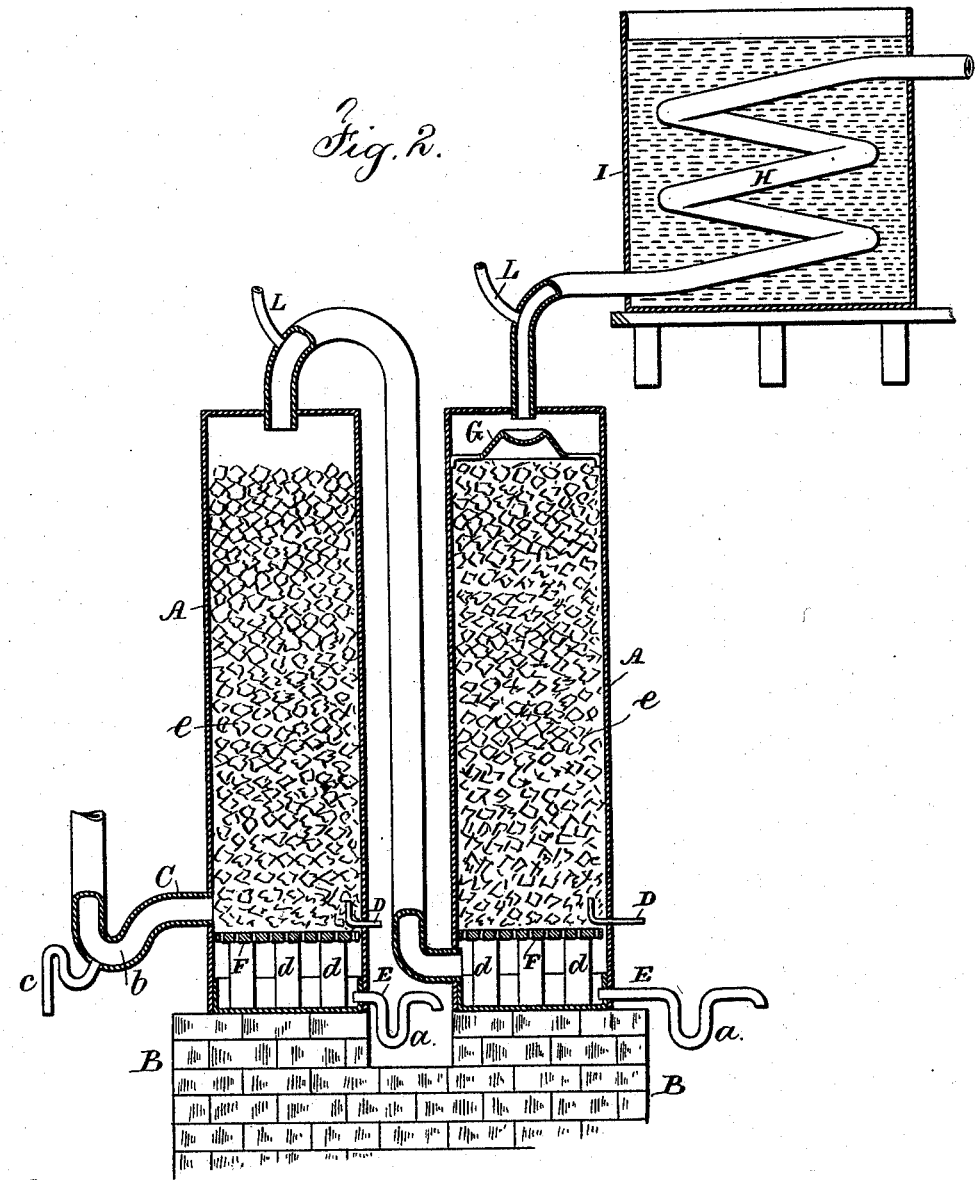

UNITED STATES PATENT OFFICE.

JEAN V. SKOGLUND, OF BROOKLYN, NEW YORK, ASSIGNOR OF ONE-HALF TO ALBERT WINTER, OF NEW YORK, N. Y.

PROCESS OF MANUFACTURING NITRIC ACID.

SPECIFICATION forming part of Letters Patent No. 591,087, dated October 5, 1897.

Application filed April 2, 1895. Renewed March 6, 1897. Serial No. 626,320. (No model.)

*To all whom it may concern:*

Be it known that I, JEAN V. SKOGLUND, of Brooklyn, in the county of Kings and State of New York, have invented a new and Improved Nitric-Acid Condenser, of which the following is a full, clear, and exact description.

In the manufacture of nitric acid impurities and acid vapors pass off from the still or generator into the receiving or condensing vessels and the acid produced is more or less discolored and contaminated by the red gases that pass off from the generator.

In the present invention I make use of a tower or chamber containing pieces of acid-proof material, and the vapors from the still are admitted into the lower part of this tower or chamber and rise up within the same, and they are condensed upon such pieces of acid-proof material, forming upon the same liquid films, and in consequence of the watery materials contained with the acid condensing at a higher temperature than the acid it is only necessary to maintain the tower or chamber at a temperature corresponding, or nearly so, to the boiling-point of the acid, so that the watery materials are condensed in the form of a weak acid, and I employ in addition a condenser located in such a manner that the acid as it is condensed runs back upon the pieces of acid-proof material in the chamber or tower. The result of this method of treating nitric acid is that the acid is produced chemically pure, because the heat in the tower or chamber is sufficient to volatilize or drive off the red gases and impurities, but not sufficient to volatilize the nitric acid itself when the same has assumed a liquid form, and the operation is further assisted by the oxidizing action of air admitted into the tower.

When making strong acid, I use two or more towers filled with pieces of acid-proof material, the nitric-acid vapors passing from the generator into the first tower, and this tower is to be maintained at a sufficiently high temperature to prevent the condensation of a strong nitric acid, and only a weak nitric acid will pass from the first tower, and in the second tower or chamber at a lower temperature the nitric acid flows in thin films from a condenser over the surfaces of the pieces of material in such chamber, and in so doing all the red gases and impurities will be vaporized as the acid trickles down over such pieces of material in the tower or chamber and the chemically-pure acid is taken away from the bottom thereof, and the red vapors and impurities are led away in a gaseous form to a suitable condenser or receiver. By this improvement a greater yield of nitric acid is obtained and the same is white and substantially chemically pure.

In the drawings I have shown in Figure 1 a vertical section of the apparatus with a single tower or chamber, and in Fig. 2 there are two connected towers or chambers, the strong nitric acid being received from the second one.

The tower A, which is made of acid-proof material, consists of a cylinder closed at the top and bottom, supported by a pier B. In one side of the tower is inserted a supply-pipe C for conveying the acid vapors to the tower, and in the opposite side is inserted an air-pipe D, the inner end of which is preferably turned up at right angles. In the bottom of the tower is inserted a discharge-pipe E, furnished with a trap *a*. The supply-pipe C is curved downwardly, forming a trap *b*, and in the lower portion of the trap is inserted the trapped discharge-pipe *c*. In the tower A, below the supply-pipe C and air-pipe D, is placed a horizontal perforated partition F, of acid-proof material, which is supported upon standards *d*, resting on the bottom of the tower.

On the perforated horizontal partition F is placed a quantity of broken or granulated pieces or perforated disks of acid-proof material *e*, which loosely fill or subdivide the tower or a portion thereof, and in the upper portion of the tower A is supported a truncated cone G of acid-proof material, the top of the cone being concaved, as shown. This cone is intended to more evenly distribute the acid in the tower. In the center of the top of the tower A is inserted the lower end of a condensing-coil H, the said coil being contained by a tank I, filled with water or any other liquid, which surrounds the coil and removes the heat of the acid vapors, or the coil may be cooled by the atmosphere or in any other suitable manner. Instead of the coil H any other suitable apparatus may be used for condensing the vapors. The upper end of the coil H discharges into the top of an auxiliary condenser J, and the auxiliary condenser J communicates through a pipe $f$ with the lower end of the coil H. A pipe K communicates with the top of the auxiliary condenser J and conveys the lower oxids of nitrogen, chlorin, or nitric-acid vapors that may not have been previously condensed to an auxiliary condenser or any apparatus suitable for recovering such vapors.

The nitric-acid vapors from the generator are conveyed by the pipe C to the interior of the tower A and are partly condensed by contact with the material $e$ in the tower and by the walls of the tower, and rising to the top of the tower they pass into the condensing-coil H, where the greater portion of the acid vapor is condensed, the condensed vapor returning by gravity to the tower, and, falling into the cavity in the top of the cone G, it overflows and passes down the sides of the cone in a thin film and is delivered from the circumference of the base of the cone to the materials in the tower, and being spread out over a large area it comes in contact with the incoming acid vapor. The vapors, partly from their heat and partly by mechanical action, free the impure condensed acid from chlorin and the lower oxids of nitrogen, and when the nitric acid reaches the bottom of the tower it is in an almost chemically pure state.

In place of using a cooling apparatus on the top of the tower for condensing the nitric-acid vapors I may condense the vapors in the tower itself by means of running cold nitric acid from a previous distillation introduced into the tower by a pipe L. The descending cold nitric acid will be heated to the boiling-point, or nearly so, by the hot vapors, which at the same time are liquefied. The acid is purified in the same way as before. The lower oxids of nitrogen and chlorin pass away at the top of the tower. The acid is discharged from the tower through the pipe E, which may be connected with a coil for cooling the acid.

To accelerate the oxidizing operation and assist mechanically the bleaching of the condensed vapors, a current of air is introduced through the pipe D into the tower A, thus oxidizing the lower oxids of nitrogen to nitric acid and increasing the yield. In actual practice two retorts or generators are connected with one tower and are run alternately, thus preventing the tower from being cooled down below an effective temperature.

I preferably make the condensing coil or apparatus of lead, more especially when strong nitric acid is manufactured. Heretofore glass and earthenware only have been used in practice for condensing nitric vapors, but I have proved by experiment that lead resists quite well the action of such vapors and is strong and a good conductor of heat. If, in making strong nitric acid the boiling-point of which is about 86° centigrade, the temperature of the tower is kept at or about 86°, then only such acid vapors can be condensed in said tower the boiling-point of which is above said temperature of 86° centigrade. Owing to the complete contact between the vapors and the condensed acid I have been able to separate the distilled product into acids of different strengths, which separation is especially advantageous toward the end of the distillation, when weaker acid commences to distil over. To accomplish this separation of acids of different strengths, instead of using one tower, as represented in the drawing, Fig. 1, I use two or more towers connected with each other, the upper part of the first tower being connected with the lower part of the second, and so on, as illustrated in Fig. 2. The outlets for the condensed products in the different towers are so arranged as to allow the acids condensed in each tower to discharge independently of the acids of the other towers. I may use a cooling device for each tower, by which means I regulate the required temperature in such tower. By dividing one tower by horizontal partitions and connecting these different sections with each other, so as to allow the gases to pass up and the condensed vapors to be discharged by each section separately, I arrive at the same result as by having several separate towers.

In instances where nitric-acid vapors have been introduced into a vessel and partially condensed and then passed through a cooler that is at a temperature not low enough to condense impurities the acid is not kept in thin films, as in my improvement.

In my process the condenser is of a temperature low enough to condense impurities, and the acid that runs back into the column or chamber is not pure, but as it trickles over the pieces of acid-proof material the thin films are exposed to the hot acid vapors and to the oxidizing action of the air, and hence there is a double action in the driving off of impurities and bleaching of the acid and an absorption of the nitric-acid vapors, so that when the liquid reaches the bottom of the tower it is substantially chemically-pure acid.

I claim as my invention—

1. The method herein specified of manufacturing nitric acid, consisting in conveying the nitric-acid vapors into a chamber containing pieces of acid-proof material, causing such vapors to condense and run in thin films over such pieces of acid-proof material, maintaining the temperature of such chamber at the temperature of the incoming nitric-acid vapors or nearly so, condensing the acid vapors and allowing the liquid to run back over such pieces of acid-proof material for driving off impurities from the acid, substantially as set forth.

2. The method herein specified of manufacturing nitric acid, consisting in passing the nitric-acid vapors into a chamber containing pieces of acid-proof material, maintaining the temperature of said chamber equal to or higher than the boiling-point of the nitric acid, and at such a temperature that the watery materials will be condensed, and passing the nitric-acid vapors into a second tower or chamber containing pieces of acid-proof material and maintaining such tower or chamber at a temperature corresponding or nearly so to the entering nitric-acid vapors, condensing the vapors and allowing the nitric acid to run back over the pieces of acid-proof material in the form of thin films and conveying away the gaseous impurities, thereby producing a substantially pure nitric acid, substantially as set forth.

3. The method herein specified of making nitric acid, consisting in passing the nitric-acid vapors into a chamber or tower containing pieces of acid-proof material, condensing such vapors and allowing the nitric acid to run in thin films over the pieces of acid-proof material, maintaining the temperature sufficiently high to drive off impurities and simultaneously exposing the acid to the oxidizing action of atmospheric air, substantially as specified.

JEAN V. SKOGLUND.

Witnesses:
JNO. M. RITTER,
F. W. HANAFORD.